(12) United States Patent
Neff et al.

(10) Patent No.: US 6,623,120 B2
(45) Date of Patent: *Sep. 23, 2003

(54) VIDEO PROJECTION SYSTEM AND DESIGN METHOD THEREFOR

(75) Inventors: Dennis B. Neff, Bartlesville, OK (US); Charles N. Sugg, Bartlesville, OK (US); John R. Grismore, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/074,987

(22) Filed: Feb. 12, 2002

(65) Prior Publication Data

US 2003/0151722 A1 Aug. 14, 2003

(51) Int. Cl.[7] .................. G03B 21/00; G03B 21/22; G03B 21/26; G03B 35/08; G02B 27/22
(52) U.S. Cl. .................. 353/7; 353/10; 353/28; 353/74; 359/462; 359/477; 352/57; 352/61
(58) Field of Search .................. 353/7, 10, 28, 353/74; 359/458, 462, 475, 477, 478, 479; 352/57, 61

(56) References Cited

U.S. PATENT DOCUMENTS

| | | | |
|---|---|---|---|
| 3,695,751 A | 10/1972 | Watanuki | 350/125 |
| 4,022,522 A | 5/1977 | Rain | 350/117 |
| 4,339,175 A | 7/1982 | Asterö | 352/85 |
| 5,159,362 A | 10/1992 | Monroe et al. | 352/85 |
| 5,731,816 A * | 3/1998 | Stewart et al. | 345/419 |
| 5,903,458 A * | 5/1999 | Stewart et al. | 364/468.04 |
| 5,905,593 A * | 5/1999 | Lo et al. | 359/463 |
| 5,944,403 A * | 8/1999 | Krause | 353/74 |
| 6,128,130 A | 10/2000 | Zobel et al. | 359/443 |
| 6,188,517 B1 | 2/2001 | Neff et al. | 359/451 |
| 6,297,814 B1 * | 10/2001 | Masuda et al. | 345/204 |
| 6,315,416 B1 * | 11/2001 | Dominguez-Montes et al. | 353/99 |
| 6,364,490 B1 * | 4/2002 | Krause | 353/77 |
| 6,445,407 B1 * | 9/2002 | Wright | 348/51 |
| 2002/0032553 A1 * | 3/2002 | Simpson et al. | 703/8 |
| 2002/0039229 A1 * | 4/2002 | Hirose et al. | 359/451 |

* cited by examiner

Primary Examiner—Russell Adams
Assistant Examiner—Melissa Koval
(74) Attorney, Agent, or Firm—Kameron D. Kelly (57) ABSTRACT

A video projection system employing a concave video screen which provides for enhanced depth cueing. A method of designing a variety of shapes of video screen surfaces by varying certain parameters of a common master equation. Video screen surface shapes providing optimum viewing for specific applications.

37 Claims, 5 Drawing Sheets

VIDEO PROJECTION SYSTEM AND DESIGN METHOD THEREFOR

BACKGROUND OF THE INVENTION

1. Field of the Invention

The present invention relates generally to video projection systems. In another aspect, this invention concerns a 3D video screen which provides enhanced depth cueing. In still another aspect, this invention concerns a method for designing and/or constructing a concave 3D video screen surface.

2. Description of the Prior Art

Video projection systems are useful for a variety of applications. Most conventional video projection systems employ a relatively flat screen surface on which images are displayed. Such conventional flat video screen surfaces provide no depth cueing (i.e., 3D effect) unless multiple projectors and/or 3D stereo glasses are employed. However, the use of multiple projectors and 3D stereo glasses is cost prohibitive for most video projection applications.

It has recently been discovered that enhanced depth cueing can be provided without the use of multiple projectors or stereo glasses by employing a specially designed concave video screen. U.S. Pat. No. 6,188,517 (assigned to Phillips Petroleum Company) describes such a concave video screen. The screen described in U.S. Pat. No. 6,188,517 generally comprises a concave semi-dome ceiling section, a flat semi-circular floor section, and a semi-cylindrical wall section edgewise joined between the ceiling section and the floor section. While this configuration provides enhanced depth cueing for certain viewing applications, it has been discovered that other video applications are best viewed on modified concave video screens in order to provide maximum viewing area, minimum distortion, and maximum depth cueing.

Because different video applications require different screen designs in order to provide optimum viewing, it is important for the shape of the video screen surface to be tailored for the specific application. However, tailoring the design of a concave video screen surface to a specific application can be an arduous task because, due to its complex shape, the screen surface is difficult to define. Further, once a suitable screen surface has been designed, it can be difficult to accurately manufacture the screen due to the complexity of the screen surface shape.

OBJECTS AND SUMMARY OF THE INVENTION

It is an object of this invention to provide 3D video projection systems which are optimized for specific applications.

Another object of this invention is to provide a simplified system for defining the shape of a complex concave video screen surface.

A further object of this invention is to provide a method for designing optimized concave video screens.

A still further object of this invention is to provide a method for manufacturing optimized concave video screens.

A yet further object of the present invention is to provide optimized 3D video screens which provide enhanced depth cueing, maximum viewing area, and minimum distortion for specific viewing applications.

In accordance with one embodiment of the present invention, a method for designing a concave 3D video screen surface is provided. The screen surface extends generally inwardly from a front edge of the screen surface. The screen surface includes an equator dividing the screen surface into a normally upper portion and a normally lower portion. The design method includes the steps of: (a) determining a maximum screen width ($X_{max}$); (b) determining a maximum screen height above the equator ($Z_{max}$); (c) determining a rounded corner radius ($r_c$) for the front face; and (d) calculating the location of a plurality of screen surface points by inputting $X_{max}$, $Z_{max}$, and $r_c$ into a master equation.

$$y = \left(\left[1 - \left(\frac{|x|^P}{a^P}\right)\right] \cdot b^P\right)^{\frac{1}{P}}, \text{ wherein}$$

$$a = \frac{X_{max}}{2} \text{ if } |z| < \left(\frac{X_{max}}{2} - r_c\right),$$

$$a = \left(\frac{X_{max}}{2} - r_c\right) + \sqrt{r_c^2 - \left(|z| - \left(\frac{X_{max}}{2} - r_c\right)\right)^2} \text{ if } |z| \geq \left(\frac{X_{max}}{2} - r_c\right),$$

$$b = \sqrt{\left(1 - \frac{z^2}{Z_{max}^2}\right) \cdot \left(\frac{X_{max}}{2}\right)^2}, \text{ and}$$

$$P = 2 - \left(\frac{k \cdot |z|}{Z_{max}}\right),$$

wherein $X_{max}$ is in a range of from about 6 inches to about 1200 inches, wherein $Z_{max}$ is in a range of from about 0.1 $X_{max}$ to about 0.5 $X_{max}$, wherein $r_c$ is in a range of from about 0 to about 0.5 $X_{max}$, wherein k is in a range of from 0.1 to about 0.95, wherein the screen surface extends relative to orthogonal X, Y, and Z axes, wherein x is the orthogonal distance from the Y-Z plane to the display surface, wherein y is the orthogonal distance from the X-Z plane to the display surface, wherein z is the orthogonal distance from the X-Y plane to the surface, and wherein the actual position of each point defining the display surface varies by less than 0.1 $X_{max}$ from the calculated position of the point as defined by the master equation.

In accordance with still another embodiment of the present invention, a 3D video projection system is provided. The video projection system generally comprises a housing, a concave video screen, and a projector. The video screen and projector are positioned within the housing. The projector is operable to project an image on the video screen. The housing has an opening therein through which the video screen can be viewed from outside the housing.

BRIEF DESCRIPTION OF THE DRAWING FIGURES

FIG. 1d is an isometric view of the concave video screen surface of FIG. 1a.

FIG. 2b is a side view of the concave video screen surface of FIG. 2a.

FIG. 2c is a top view of the concave video screen surface of FIG. 2a.

FIG. 2d is an isometric view of the concave video screen surface of FIG. 2a.

FIG. 3b is a side view of the concave video screen surface of FIG. 3a.

FIG. 3c is a top view of the concave video screen surface of FIG. 3a.

FIG. 3d is an isometric view of the concave video screen surface of FIG. 3a.

FIG. 4b is a side view of the concave video screen surface of FIG. 4a.

FIG. 4c is a top view of the concave video screen surface of FIG. 4a.

FIG. 4d is an isometric view of the concave video screen surface of FIG. 4a.

DETAILED DESCRIPTION OF THE PREFERRED EMBODIMENTS

One embodiment of the present invention concerns a method for designing and constructing concave video screens. As discussed above, the optimal shape for a concave video screen surface may vary depending on the viewing application for which it is used.

It has been discovered that the efficiency of designing and constructing concave video screens can be greatly enhanced by employing a master equation for determining the shape of the screen surface based on certain common parameters. The master equation can be employed in the design of the screen surface to allow the designer to simply change certain parameters and then view the screen surface shape using standard 3D modeling computer software. The master equation can also be employed in the manufacture of concave video screens by using the master equation to calculate a set of 3D coordinates defining the screen surface. These calculated 3D coordinates can be used to create templates for making the screen, or for controlling the machinery (e.g., programmable milling machines) used to make the video screen.

Referring now to FIGS. 1a, 1b, 1c, and 1d, a sample concave video screen surface 10 is defined by certain parameters (i.e., $X_{max}$, $Z_{max}$, and $r_c$) which can be employed in the master equation to define its shape. The shape of screen surface 10 is defined relative to orthogonal X, Y, and Z axes. Screen surface 10 has a generally planar front edge 12 which lies in the X-Z plane. Screen surface 10 has a generally planar equator 14 which lies in the X-Y plane. Screen surface 10 has a generally planar central meridian 16 which lies in the Y-Z plane. The maximum width ($X_{max}$) of screen surface 10 is the distance between the two sides of front edge 12, measured along the X axis. The maximum height ($Z_{max}$) of screen surface 10 above equator 14 is the distance from the X-Y plane to the upper-most point on front edge 12, measured along the Z axis. The maximum depth ($Y_{max}$) of screen surface 10 is the distance from the X-Z plane to screen surface 10 measured along the Y axis. Front edge 12 can have a rounded corner 18 defined by a rounded corner radius ($r_c$). The rounded corner radius ($r_c$) can vary between 0.0 and $X_{max}/2$. When $r_c$ equals $X_{max}/2$, front edge 12 has a generally circular or elliptical shape. When $r_c$ equals 0.0, front edge 12 has a generally square or rectangular shape. Each point defining screen surface 10 has a unique x, y, z coordinate measured relative to the X, Y, and Z axes.

The master equation of the present invention can be expressed as follows:

$$y = \left(\left[1 - \left(\frac{|x|^P}{a^P}\right)\right] \cdot b^P\right)^{\frac{1}{P}}, \text{ wherein}$$

$$a = \frac{X_{max}}{2} \text{ if } |z| < \left(\frac{X_{max}}{2} - r_c\right),$$

$$a = \left(\frac{X_{max}}{2} - r_c\right) + \sqrt{r_c^2 - \left(|z| - \left(\frac{X_{max}}{2} - r_c\right)\right)^2} \text{ if } |z| \geq \left(\frac{X_{max}}{2} - r_c\right),$$

$$b = \sqrt{\left(1 - \frac{z^2}{Z_{max}^2}\right) \cdot \left(\frac{X_{max}}{2}\right)^2}, \text{ and}$$

$$P = 2 - \left(\frac{k \cdot |z|}{Z_{max}}\right).$$

In the above master equation, $X_{max}$, $Z_{max}$, and $r_c$ are the parameters shown in FIG. 1, while k is an edge transition constant for controlling the angle of screen surface 10 relative to the X-Z plane proximate front edge 12. The edge transition constant (k) can vary from 0.0 to 1.0. When k equals 0.0, the portion of screen surface 10 immediately adjacent front edge 12 extends from front edge 12 in a direction which is at least substantially perpendicular to the X-Z plane. When k equals 1.0, the portion of screen surface 10 immediately adjacent front edge 12 extends from front edge 12 in a direction which is at least substantially planar and oblique to the X-Z plane.

When the values for $X_{max}$, $Z_{max}$, $r_c$, and k are entered into the master equation, the master equation can be used to calculate the x, y, z coordinates of the plurality of screen surface points which define the surface of the screen. Prior to calculating the screen surface points, an X axis increment ($\Delta x$) and a Z axis increment ($\Delta z$) can be determined to control the spacing and number of the screen surface points calculated. Thus, the master equation can be employed to calculate a y coordinate for each $\Delta x$ increment between $-X_{max}/2$ and $X_{max}/2$ and each $\Delta z$ increment between $-Z_{max}$ and $Z_{max}$. Alternatively, when it is desired to only calculate the shape of the screen surface above equator 14, the master equation can be employed to calculate a y coordinate for each $\Delta x$ increment between $-X_{max}/2$ and $-X_{max}/2$ and each $\Delta z$ increment between 0.0 and $Z_{max}$.

Although the master equation is expressed herein as calculating y coordinates as a function of x, z, $X_{max}$, $Z_{max}$, $r_c$, and k, it is entirely within the ambit of the present invention for the master equation to be rearranged so as to yield x coordinates as a function of y, z, $X_{max}$, $Z_{max}$, $r_c$ and k, or z coordinates as a function of x, y, $X_{max}$, $Z_{max}$, $r_c$, and k.

Referring now to FIGS. 2a, 2b, 2c, and 2d, a prior art concave video screen surface 100 is illustrated in relation to orthogonal X, Y, and Z axes. Video screen surface 100 has substantially the same shape as the video screen surface described in U.S. Pat. No. 6,188,517, the entire disclosure of which is incorporated herein by reference. Video screen surface 100 includes a concave semi-dome ceiling 102, a flat semi-circular floor 104, and a semi-cylindrical wall 106 edgewise joined between ceiling 102 and floor 104. The portion of screen surface 100 presented by ceiling 102 can be expressed by the master equation. The shape of ceiling 102 can be defined by the parameters (i.e., $X_{max}$, $Z_{max}$, and $r_c$, and k) discussed above with reference to FIG. 1. As perhaps best illustrated in FIG. 2a, $r_c$ for ceiling 102 is equal to $X_{max}/2$. Having $r_c$ equal $X_{max}/2$ causes the front edge 108 of ceiling 102 to be semi-circular in shape. As perhaps best illustrated in FIG. 2c, k for ceiling 102 is equal to 0.0, and thus the portion of screen surface 102 immediately adjacent front edge 108 extends perpendicular to the X-Z plane. The exact parameters for the portion of screen surface 100 presented by ceiling 102 in FIG. 2 are as follows: $X_{max}$=41 inches, $Z_{max}$=20.5 inches, $r_c$=20.5 inches, and k=0.0.

Although screen surface 100 is suitable for certain applications, it has been discovered that different screen shapes present advantages for other applications. FIGS. 3a, 3b, 3c and 3d illustrate a screen surface 200 particularly suited for viewing applications such as home cinematography. Screen surface 200 includes an upper portion 202 located above equator 204 and a lower portion 206 located below equator 204.

Upper portion 202 can be defined by the master equation, expressed above, while lower portion 206 has a generally cylindrical, toroidal or even ellipsoidal shape, depending on the requirements of the specific viewing application. As perhaps best illustrated in FIG. 3a, the rounded corners 208 of front edge 210 of upper portion 202 have a radius of curvature ($r_c$) which is less than $X_{max}/2$. This lower $r_c$ value effectively "opens up" the corners of screen surface 200 and allows screen surface 200 to provide more viewing area for watching conventionally formatted media (e.g., movies). The $r_c$ value for upper portion 202 of screen surface 200 is preferably in a range of from about 0.0 to about 0.5 $X_{max}$, more preferably from about 0.01 $X_{max}$ to about 0.25 $X_{max}$, still more preferably of from about 0.025 $X_{max}$ to about 0.1 $X_{max}$, and most preferably from 0.04 $X_{max}$ to 0.06 $X_{max}$. As perhaps best illustrated in FIG. 3c, the portion of screen surface 200 immediately adjacent front edge 210 extends at an angle which is less than perpendicular relative to the X-Z plane, thereby effectively "flattening out" the portion of screen surface 200 proximate front edge 210. This "flattening out" of screen surface 200 proximate front edge 210 reduces image distortion on that portion of screen surface 200. The "flattening out" of the screen surface is caused by employing a k value in the master equation which is greater than 0.0. Upper portion 202 of screen surface 200 preferably has a k value in a range of from about 0.1 to about 0.95, more preferably from about 0.25 to about 0.75, and most preferably from 0.4 to 0.6. Referring again to FIGS. 3a, 3b, 3c and 3d, the $Z_{max}$ value for upper portion 202 of screen surface 200 is preferably in a range of from about 0.1 $X_{max}$ to 0.5 $X_{max}$, more preferably from 0.2 $X_{max}$ to 0.4 $X_{max}$, and most preferably 0.25 $X_{max}$ to 0.32 $X_{max}$. The $X_{max}$ value for upper portion 202 of screen surface 200 is preferably in a range of from about 6 inches to about 1200 inches, more preferably from about 24 inches to about 96 inches, and most preferably from 36 to 48 inches.

FIGS. 4a, 4b, 4c, and 4d illustrate a screen surface 300 which is particularly suited for viewing applications such as video games. In contrast to the screen surfaces described with reference to FIGS. 2 and 3, both an upper portion 302 and a lower portion 304 of screen surface 300 are defined by the master equation. As perhaps best illustrated in FIG. 4a, the corners 306 of front edge 308 of screen surface 300 are substantially square. These square corners 306 are provided by employing a small $r_c$ value in the master equation. The $r_c$ value for screen surface 300 is preferably in the range of from about 0.0 to about 0.5 $X_{max}$, more preferably $r_c$ is less than about 0.1 $X_{max}$, still more preferably less than about 0.05 $X_{max}$, and most preferably about 0.0. Screen surface 300 has a k value which causes at least a partial "flattening out" of the portion of screen surface 300 proximate terminal edge 308. The k value for screen surface 300 is preferably in the range of from about 0.1 to about 0.95, more preferably from about 0.25 to about 0.75, and most preferably from 0.4 to 0.6. The $Z_{max}$ value for screen surface 300 is preferably in the range of from about 0.1 $X_{max}$ to about 0.5 $X_{max}$, more preferably from 0.25 $X_{max}$ to 0.45 $X_{max}$, and most preferably from 0.35 $X_{max}$ to 0.40 $X_{max}$. The $X_{max}$ value for screen surface 300 is preferably in a range of from about 6 inches to about 1200 inches, more preferably from about 12 inches to about 60 inches, and most preferably from 16 inches to 36 inches. The aspect ratio, which is the ratio of maximum height (i.e., 2 $Z_{max}$) to maximum width (i.e., $X_{max}$) of screen surface 300, is preferably in a range of from about 1:2 to about 1:1, more preferably from about 5:8 to about 7:8, and most preferably about 3:4. The ratio of maximum depth to maximum width for screen surface 300 is preferably in a range of from about 0.1:1 to about 1:1, more preferably from about 0.2:1 to about 0.5:1, and most preferably from 0.3:1 to 0.4:1.

As described and shown above, the master equation can be employed to design and manufacture a variety of different screen shapes. The actual shape of the manufactured screen surface should be substantially the same as the calculated shape of the screen surface defined by the master equation. Although minor variations between the actual and calculated screen surface shapes are inevitable, it is preferred for the actual position of each point defining the actual screen surface to vary by less than 0.1 $X_{max}$ from the calculated position of the point defined by the master equation. More preferably, the actual position of each point defining the actual screen surface varies by less than 0.05 $X_{max}$ from the calculated position of the point. For example, if $X_{max}$=20 inches and the calculated y coordinate for the screen surface at x=3.0 inches and z=4.0 inches is 2.0 inches, then the actual y coordinate for the actual screen surface at x=3.0 inches and z=4.0 inches is preferably 2±0.2 inches, more preferably 2±0.1 inches.

Figure 1A:
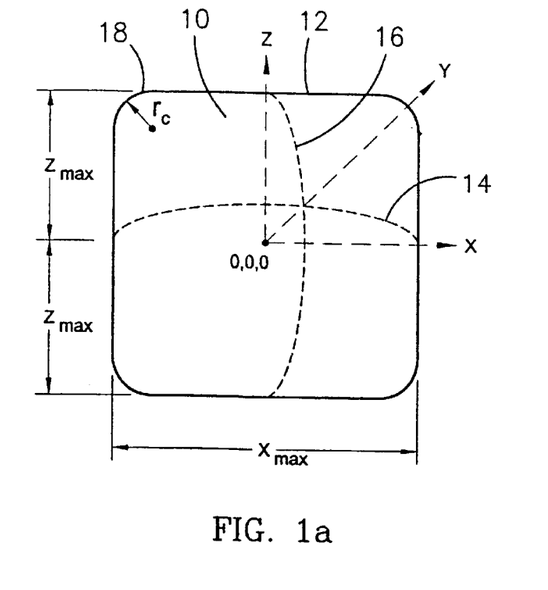
FIG. 1a is a front perspective view of a concave video screen surface, particularly illustrating the parameters (i.e., $X_{max}$, $Z_{max}$, and $r_c$) which at least partly determine the shape of the screen surface and the position of the screen surface relative to the X, Y, and Z coordinate axes.
Figure 1B:
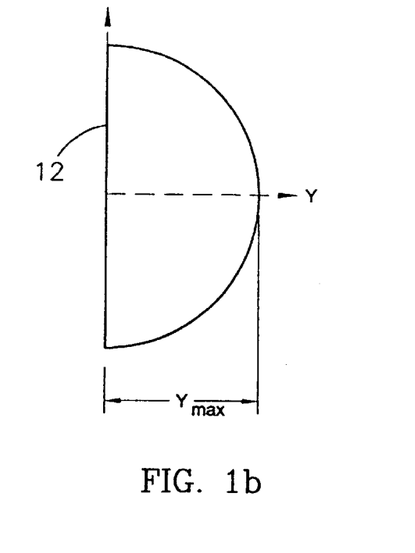
FIG. 1b is a side view of the concave video screen surface of FIG. 1a, particularly illustrating the position of the screen surface relative to the Y and Z axes.
Figure 1C:
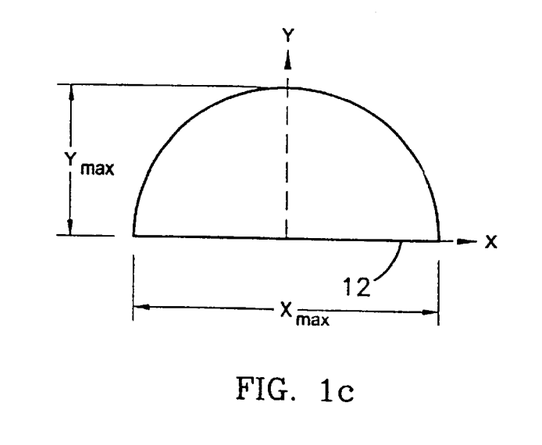
FIG. 1c is a top view of the concave video screen surface of FIG. 1a, particularly illustrating the position of the screen surface relative to the X and Y axes.
Figure 1D:
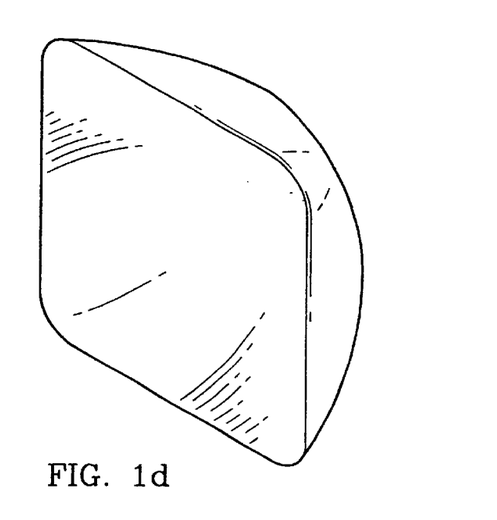
Figure 2A:
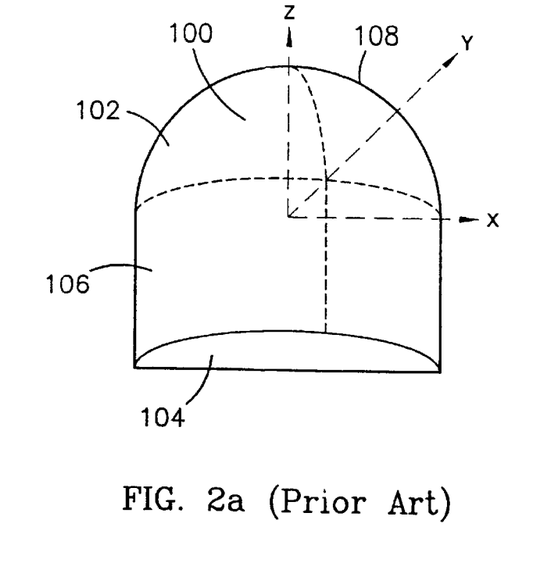
FIG. 2a is a front perspective view of a prior art concave video screen surface, with the upper domed portion of the screen surface being defined, at least in part, by the parameters set forth in FIG. 1.
Figure 2B:
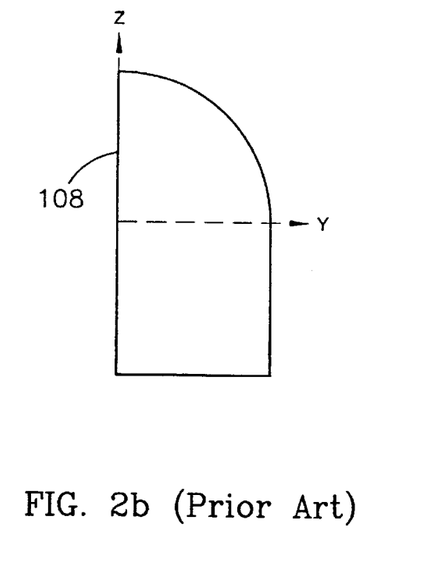
Figure 2C:
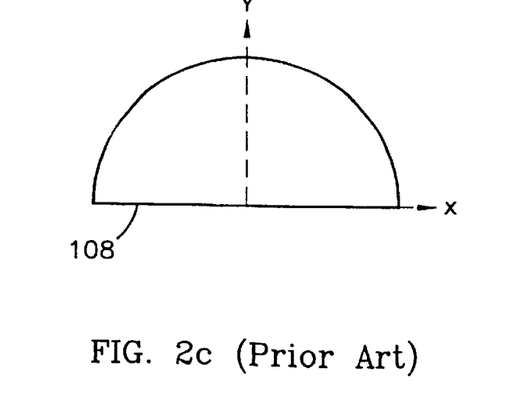
Figure 2D:
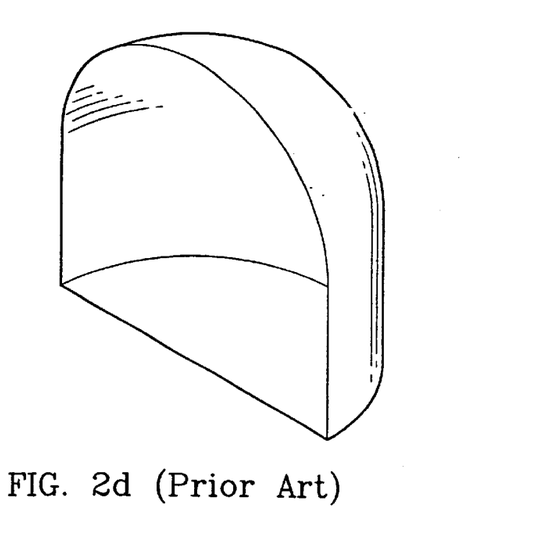
Figure 3A:
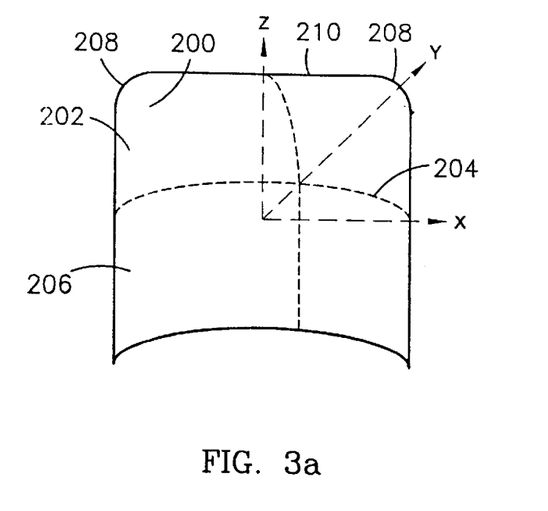
FIG. 3a is a front perspective view of an inventive concave video screen surface, with the upper portion of the screen surface being defined, at least in part, by the parameters set forth in FIG. 1.
Figure 3B:
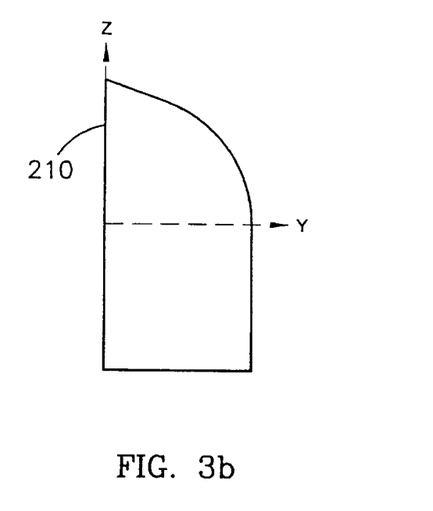
Figure 3C:
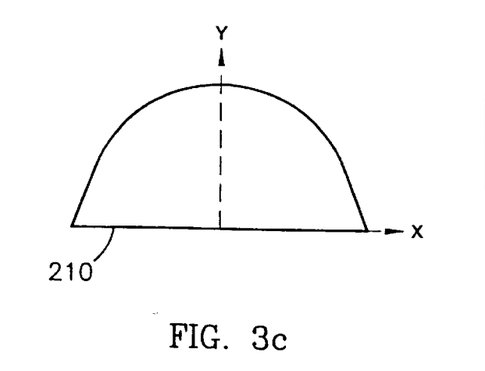
Figure 3D:
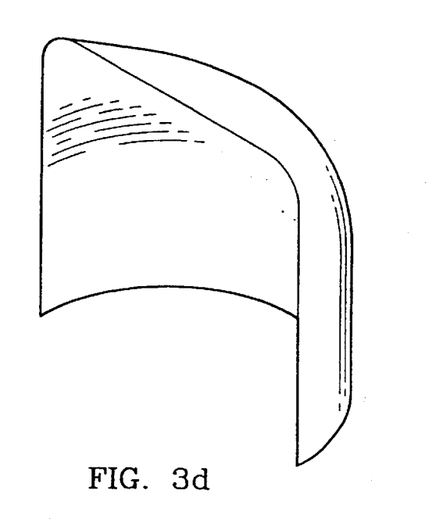
Figure 4A:
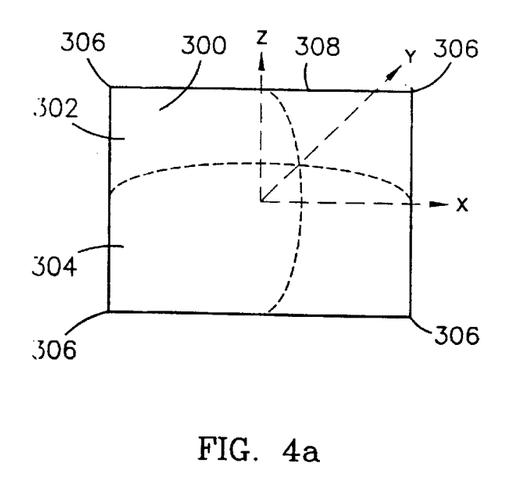
FIG. 4a is a front perspective view of an inventive concave video screen surface, with the entire screen surface being defined, at least in part, by the parameters set forth in FIG. 1.
Figure 4B:
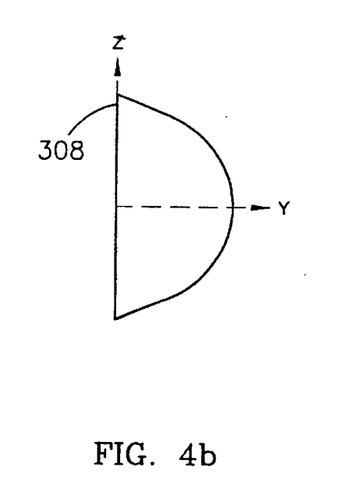
Figure 4C:
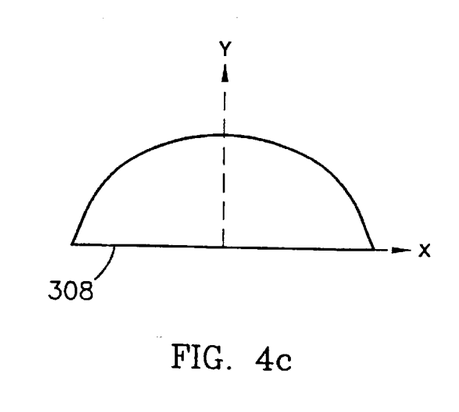
Figure 4D:
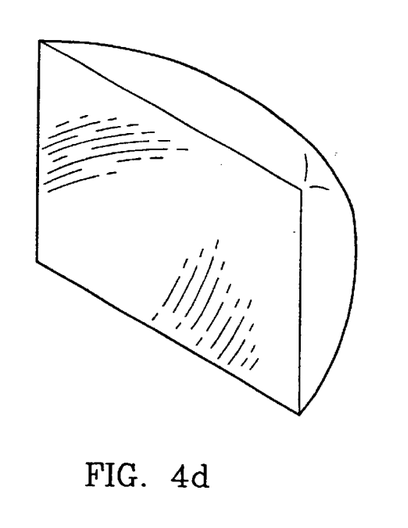
Figure 5:
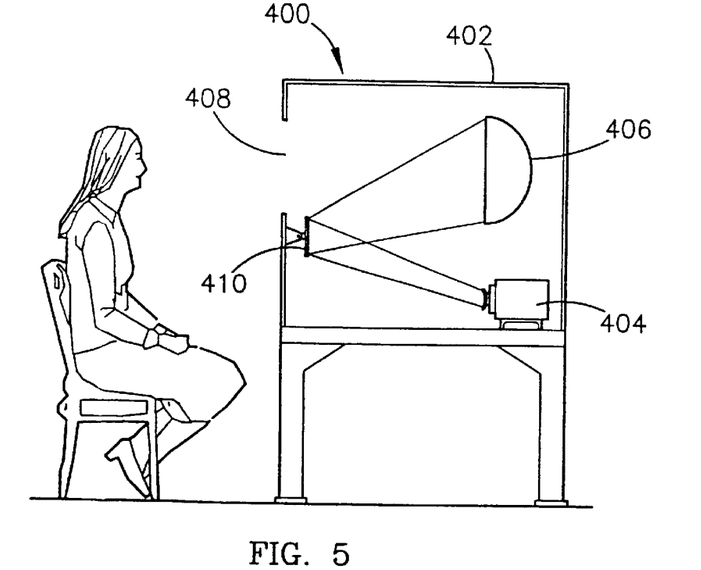
FIG. 5 is a schematic elevation side view of a 3D video projection system constructed in accordance with the principles of the present invention.

FIG. 5 illustrates a 3D video projection system 400 which generally comprises a housing 402, a projector 404, and a concave video screen 406. Projector 404 and screen 406 are positioned within housing 402., Housing 402 is substantially closed, so as to prevent an excessive amount of light from entering the interior space of housing 402. However, housing 402 defines an opening 408 which allows screen 406 to be viewed from outside of housing 402. Video projection system 400 may include a mirror 410 for reflecting the image produced by projector 404 onto screen 406. Preferably, screen 406 presents a surface similar to that described above with reference to FIG. 4.

Figure 6:
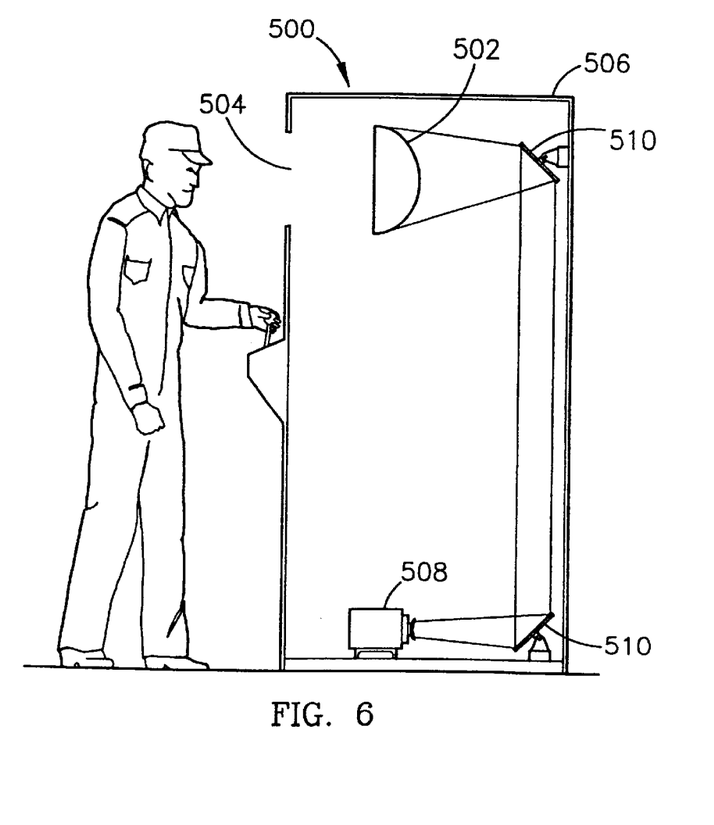
FIG. 6 is a schematic elevation side view of an alternative 3D video projection system constructed in accordance with the principles of the present invention.

FIG. 6 illustrates an alternative 3D video projection system 500 similar to that illustrated in FIG. 5. However, video projection system 500 is a rear projection system wherein the image is displayed on a backside of the screen 502 and can be viewed from a front side of the screen 502 via the opening 504 in the housing 506. Screen 502 is preferably vertically spaced from the projector 508. A plurality of mirrors 510 can be employed to reflect the image emitted by projector 508 onto the backside of screen 502. Screen 502 preferably presents a surface similar to that described above with reference to FIG. 4. The configuration of video projection system 508 is ideal for video game applications.

Although FIGS. 5 and 6 illustrate projection systems where the projector and video screen are inside a housing, and the image on the screen is viewed from outside the housing, it should be understood that the novel screen surface shapes described herein can also be employed in more conventional theater-style or conference room configurations, as shown in U.S. Pat. No. 6,188,517, for example.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A method of designing a concave 3D video screen surface extending generally inwardly from a front edge of the screen surface, said screen surface including an equator dividing the screen surface into a normally upper portion and a normally lower portion, said method including the steps of:
   (a) determining a maximum screen width ($X_{max}$);
   (b) determining a maximum screen height above the equator ($Z_{max}$);
   (c) determining a rounded corner radius ($r_c$) for the front face; and
   (d) calculating the location of a plurality of screen surface points by inputting $X_{max}$, $Z_{max}$, and $r_c$ into a master equation, said master equation being operable to define the shape of the screen surface based on $X_{max}$, $Z_{max}$, and $r_c$.

2. A method according to claim 1; and
   (e) determining an edge transition constant value (k) between 0 and 1 for controlling the angle of the screen surface proximate the front edge.

3. A method according to claim 2,
   step (d) including the step of inputting k into the master equation.

4. A method according to claim 3,
   said screen surface extending relative to orthogonal X, Y, and Z axes,
   said plurality of screen surface points each having a unique x, y, z coordinate measured relative to the orthogonal X, Y, and Z axes,
   said master equation being employed in step (d) to calculate the x, y, z coordinates of the plurality of screen surface points as a function of $X_{max}$, $Z_{max}$, $r_c$, and k.

5. A method according to claim 4,
   said front edge lying in the X-Z plane,
   said equator lying in the X-Y plane.

6. A method according to claim 5,
   said master equation being:

$$y = \left(\left[1 - \left(\frac{|x|^P}{a^P}\right)\right] \cdot b^P\right)^{\frac{1}{P}}, \text{ wherein}$$

$$a = \frac{X_{max}}{2} \text{ if } |z| < \left(\frac{X_{max}}{2} - r_c\right),$$

$$a = \left(\frac{X_{max}}{2} - r_c\right) + \sqrt{r_c^2 - \left(|z| - \left(\frac{X_{max}}{2} - r_c\right)\right)^2} \text{ if } |z| \geq \left(\frac{X_{max}}{2} - r_c\right),$$

$$b = \sqrt{\left(1 - \frac{z^2}{Z_{max}^2}\right) \cdot \left(\frac{X_{max}}{2}\right)^2}, \text{ and}$$

$$P = 2 - \left(\frac{k \cdot |z|}{Z_{max}}\right).$$

7. A method according to claim 6; and
   (f) determining an X axis increment ($\Delta x$) for controlling the spacing of the calculated screen surface points along the X axis; and
   (g) determining a Z axis increment ($\Delta z$) for controlling the spacing of the calculated screen surface points along the Z axis.

8. A method according to claim 7,
   step (d) including the step of calculating a y coordinate for each $\Delta x$ increment between $-X_{max}/2$ and $X_{max}/2$ and each $\Delta z$ increment between 0 and $Z_{max}$.

9. A method according to claim 7,
   step (d) including the step of calculating a y coordinate for each $\Delta x$ increment between $-X_{max}/2$ and $X_{max}/2$ and each $\Delta z$ increment between $-Z_{max}$ and $Z_{max}$.

10. A 3D video screen surface made by the method of claim 1.

11. A concave 3D video screen comprising:
    a display surface having a shape at least substantially characterized by the following master equation:

$$y = \left(\left[1 - \left(\frac{|x|^P}{a^P}\right)\right] \cdot b^P\right)^{\frac{1}{P}}, \text{ wherein}$$

$$a = \frac{X_{max}}{2} \text{ if } |z| < \left(\frac{X_{max}}{2} - r_c\right),$$

$$a = \left(\frac{X_{max}}{2} - r_c\right) + \sqrt{r_c^2 - \left(|z| - \left(\frac{X_{max}}{2} - r_c\right)\right)^2} \text{ if } |z| \geq \left(\frac{X_{max}}{2} - r_c\right),$$

$$b = \sqrt{\left(1 - \frac{z^2}{Z_{max}^2}\right) \cdot \left(\frac{X_{max}}{2}\right)^2}, \text{ and}$$

$$P = 2 - \left(\frac{k \cdot |z|}{Z_{max}}\right),$$

wherein $X_{max}$ is in a range of from about 6 inches to about 1200 inches,
wherein $Z_{max}$ is in a range of from about 0.1 $X_{max}$ to about 0.5 $X_{max}$,
wherein $r_c$ is in a range of from about 0 to about 0.5 $X_{max}$,
wherein k is in a range of from 0.1 to 0.95,
wherein said screen surface extends relative to orthogonal X, Y, and Z axes,
wherein x is the orthogonal distance from the Y-Z plane to the display surface,
wherein y is the orthogonal distance from the X-Z plane to the display surface, wherein z is the orthogonal distance from the X-Y plane to the display surface, and wherein the actual position of each point defining the display surface varies by less than 0.1 $X_{max}$ from the calculated position of the point as defined by the master equation.

12. A 3D video screen according to claim 11, $r_c$ being in a range of from about 0.01 $X_{max}$ to about 0.25 $X_{max}$.

13. A 3D video screen according to claim 12, k being in a range of from 0.25 to 0.75.

14. A 3D video screen according to claim 13, $Z_{max}$ being in a range of from about 0.20 $X_{max}$ to about 0.40 $X_{max}$.

15. A 3D video screen according to claim 14, $X_{max}$ being in a range of from about 24 inches to about 96 inches, said actual position of each point defining the display surface varying by less than 0.05 $X_{max}$ from the calculated position of the point.

16. A 3D video screen according to claim 11, $r_c$ being in a range of from about 0.025 $X_{max}$ to about 0.1 $X_{max}$.

17. A 3D video screen according to claim 16, k being in a range of from 0.4 to 0.6.

18. A 3D video screen according to claim 17, $r_c$ being in a range of from about 0.04 $X_{max}$ to about 0.06 $X_{max}$.

19. A 3D video screen according to claim 18, $X_{max}$ being in a range of from 36 inches to 48 inches, said actual position of each point defining the display surface varying by less than 0.05 $X_{max}$ from the calculated position of the point.

20. A 3D video screen according to claim 11, $r_c$ being less than about 0.1 $X_{max}$.

21. A 3D video screen according to claim 20, k being in a range of from 0.25 to 0.75.

22. A 3D video screen according to claim 21, $Z_{max}$ being in a range of from about 0.25 $X_{max}$ to about 0.45 $X_{max}$.

23. A 3D video screen according to claim 22, $X_{max}$ being in a range of from about 12 inches to about 60 inches, said actual position of each point defining the display surface varying by less than 0.05 $X_{max}$ from the calculated position of the point.

24. A 3D video screen according to claim 11, $r_c$ being less than about 0.05 $X_{max}$.

25. A 3D video screen according to claim 24, k being in a range of from 0.4 to 0.6.

26. A 3D video screen according to claim 25, $r_c$ being about 0 inches.

27. A 3D video screen according to claim 26, $X_{max}$ being in a range of from 16 inches to 36 inches, said actual position of each point defining the display surface varying by less than 0.05 $X_{max}$ from the calculated position of the point.

28. A 3D video projection system comprising:

a housing;

a concave video screen positioned in the housing;

a mirror positioned in the housing; and a projector positioned in the housing and operable to project an image on the mirror;

said mirror being operable to reflect the image onto the video screen, said housing having an opening therein through which the video screen can be viewed from outside the housing, said video screen being a rear projection video screen wherein the image is projected on a back side of the screen but the image can be viewed from a front side of the screen through the opening in the housing.

29. A 3D video projection system comprising:

a housing;

a concave video screen positioned in the housing; and a projector positioned in the housing and operable to project an image on the video screen, said housing having an opening therein through which the video screen can be viewed from outside the housing, said concave video screen having an aspect ratio in a range of from about 1:2 to about 1:1.

30. A 3D video projection system according to claim 29, said concave video screen having a maximum depth to maximum width ratio in a range of from about 0.1:1 to about 1:1.

31. A 3D video projection system comprising:

a housing;

a concave video screen positioned in the housing; and a projector positioned in the housing and operable to project an image on the video screen, said housing having an opening therein through which the video screen can be viewed from outside the housing, said concave video screen having an aspect ratio in a range of from about 5:8 to about 7:8.

32. A 3D video projection system according to claim 31, said concave video screen having a maximum depth to maximum width ratio in a range of from about 0.2:1 to about 0.5:1.

33. A 3D video projection system comprising:

a housing;

a concave video screen positioned in the housing; and a projector positioned in the housing and operable to project an image on the video screen, said housing having an opening therein through which the video screen can be viewed from outside the housing, said concave video screen including a display surface having a shape at least substantially characterized by the following equation:

$$y = \left(\left[1 - \left(\frac{|x|^P}{a^P}\right)\right] \cdot b^P\right)^{\frac{1}{P}}, \text{ wherein}$$

$$a = \frac{X_{max}}{2} \text{ if } |z| < \left(\frac{X_{max}}{2} - r_c\right),$$

$$a = \left(\frac{X_{max}}{2} - r_c\right) + \sqrt{r_c^2 - \left(|z| - \left(\frac{X_{max}}{2} - r_c\right)\right)^2} \text{ if } |z| \geq \left(\frac{X_{max}}{2} - r_c\right),$$

$$b = \sqrt{\left(1 - \frac{z^2}{Z_{max}^2}\right) \cdot \left(\frac{X_{max}}{2}\right)^2}, \text{ and}$$

$$P = 2 - \left(\frac{k \cdot |z|}{Z_{max}}\right),$$

wherein $X_{max}$ is in a range of from about 12 to about 60 inches, wherein $Z_{max}$ is in a range of from about 0.25 $X_{max}$ to about 0.45 $X_{max}$, wherein $r_c$ is less than about 0.1 $X_{max}$, wherein k is in a range of from about 0.25 to about 0.75, wherein said display surface extends relative to orthogonal X, Y, and Z axes, wherein x is the orthogonal distance from the Y-Z plane to the surface, wherein y is the orthogonal distance from the X-Z plane to the surface, wherein z is the orthogonal distance from the X-Y plane to the surface, and wherein the actual position of each point defining the display surface varies by less than 0.1 $X_{max}$ from the calculated position of the point as defined by the master equation.

34. A 3D video projection system according to claim 33, $r_c$ being less than about 0.05 $X_{max}$.

35. A 3D video projection system according to claim 34, k being in a range of from 0.4 to 0.6.

36. A 3D video projection system according to claim 35, $Z_{max}$ being in a range of from about 0.25 $X_{max}$ to about 0.45 $X_{max}$.

37. A 3D video projection system according to claim 36, $X_{max}$ being in a range of from about 16 inches to about 36 inches, said actual position of each point defining the display surface varying by less than 0.05 $X_{max}$ from the calculated position of the point.

* * * * *